US010454945B1

(12) United States Patent
Raman et al.

(10) Patent No.: US 10,454,945 B1
(45) Date of Patent: Oct. 22, 2019

(54) METHOD, APPARATUS AND COMPUTER PROGRAM PRODUCT FOR PROCESSING AN ELECTRONIC REQUEST TO ACCESS A COMPUTERIZED RESOURCE

(71) Applicant: EMC IP HOLDING COMPANY LLC, Hopkinton, MA (US)

(72) Inventors: Haim Raman, Netanya (IL); Yihezkel Schoenbrun, Raanana (IL); Julia Roschak, Raanana (IL); Itzkik Sorani, Kadima (IL); Tamar Vardy, Tel Aviv (IL); Mikael Peres, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 15/495,105

(22) Filed: Apr. 24, 2017

(51) Int. Cl.
*H04L 29/06* (2006.01)

(52) U.S. Cl.
CPC ............ *H04L 63/108* (2013.01); *H04L 63/06* (2013.01); *H04L 63/08* (2013.01)

(58) Field of Classification Search
CPC . H04L 63/108; H04L 63/0838; H04L 63/083; H04L 63/0846; H04L 63/0807; H04L 63/105; G06F 2221/2137; G06F 2221/2151
See application file for complete search history.

(56) References Cited

U.S. PATENT DOCUMENTS

| 2010/0145860 | A1* | 6/2010 | Pelegero | G06Q 20/12 705/71 |
| 2015/0312242 | A1* | 10/2015 | Ogawa | G06F 21/34 726/6 |
| 2017/0161486 | A1* | 6/2017 | Jeon | G06F 21/44 |
| 2018/0255456 | A1* | 9/2018 | Yin | H04W 12/06 |

OTHER PUBLICATIONS

Time-based OTP Authentication via Secure Tunnel (TOAST): A Mobile TOTP Scheme Using TLS Seed Exchange and Encrypted Offline Keystore, MLT Uymatiao, WES Yu—2014 4th IEEE International (Year: 2014).*

* cited by examiner

*Primary Examiner* — Alexander Lagor
*Assistant Examiner* — Vu V Tran
(74) *Attorney, Agent, or Firm* — Krishnendu Gupta

(57) ABSTRACT

Techniques are disclosed for use in authentication. In one embodiment, a method is disclosed. The method comprises receiving an electronic request to access a computerized resource. The electronic request comprises a user identifier identifying a user associated with the electronic request and a first access token. The method comprises retrieving, in response to receiving the electronic request, a time-varying token seed associated with the generation of access tokens during a time period. The time-varying token seed is different if retrieved after the expiration of the time period. The method comprises generating a second access token based on the time-varying token seed and the user identifier (Continued)

identifying the user. The method comprises comparing the first and second access tokens to determine a similarity between the respective access tokens. The method comprises determining whether to allow the user access to the computerized resource based on the similarity between the access tokens.

16 Claims, 5 Drawing Sheets

US 10,454,945 B1

METHOD, APPARATUS AND COMPUTER PROGRAM PRODUCT FOR PROCESSING AN ELECTRONIC REQUEST TO ACCESS A COMPUTERIZED RESOURCE

TECHNICAL FIELD

The present invention relates generally to authentication. More particularly, the present invention relates to a method, an apparatus and a computer program product for processing an electronic request to access a computerized resource.

BACKGROUND OF THE INVENTION

Many modern online systems that are required to scale to millions of user requests need to authenticate each user request (or at least a large proportion) in order to verify the identity of a user. For example, an IoT appliance may report an athlete's heart rate and location every second to an online server. This may be achieved by a wearable, such as a smart watch or the like, worn by the athlete that is configured to report the aforementioned statistics to the online server; for example, the statistics may be reported to an online service using a REST service over https. In order to ensure that the information is being saved correctly and the privacy of the athlete is being maintained, it will be required to authenticate each request. This may require the user name and password to be resent on every request and re-authentication to be performed on every request. Or, alternatively, upon successful verification of the login information, a new access token or the like will be generated and returned to the IoT appliance which in turn stores that particular token and sends it on every subsequent request to the online server.

Unfortunately, the difficulty with the above approaches is that the memory complexity of tracking authentication status can scale linearly to the number of users. For example, the conventional systems as described above may utilize cookies, session ids, tokens, etc. of a user who recently authenticated successfully in order to track the authentication status. However, the use of any of the aforementioned cookies, session ids, tokens, etc. requires a value associated therewith to be compared against a stored value in order to facilitate authentication. This may require an expensive scan of a potentially enormous database table on every request which can significantly impact performance. This presents a challenge with respect to scaling, because the number of rows in the database table, and thus the cost of locating a particular row, is proportional to the number of users. There is, therefore, a need to address this particular issue regardless scaling. The present invention is directed towards at least addressing this issue.

SUMMARY OF THE INVENTION

There is disclosed a method, comprising: receiving, by processing circuitry, an electronic request to access a computerized resource, wherein the electronic request comprises a user identifier identifying a user associated with the electronic request and a first access token; in response to receiving the electronic request, retrieving, by processing circuitry, a time-varying token seed associated with the generation of access tokens during a time period, wherein the time-varying token seed is different if retrieved after the expiration of the time period; generating, by processing circuitry, a second access token based on the time-varying token seed and the user identifier identifying the user; comparing, by processing circuitry, the first and second access tokens to determine a similarity between the respective access tokens; and based on the similarity between the respective access tokens, determining, by processing circuitry, whether to allow the user access to the computerized resource.

There is also disclosed an apparatus, comprising: memory; and processing circuitry coupled to the memory, the memory storing instructions which, when executed by the processing circuitry, cause the processing circuitry to: receive an electronic request to access a computerized resource, wherein the electronic request comprises a user identifier identifying a user associated with the electronic request and a first access token; in response to receiving the electronic request, retrieve a time-varying token seed associated with the generation of access tokens during a time period, wherein the time-varying token seed is different if retrieved after the expiration of the time period; generate a second access token based on the time-varying token seed and the user identifier identifying the user: compare the first and second access tokens to determine a similarity between the respective access tokens; and based on the similarity between the respective access tokens, determine whether to allow the user access to the computerized resource.

There is also disclosed a computer program product having a non-transitory computer readable medium which stores a set of instructions, the set of instructions, when carried out by processing circuitry, causing the processing circuitry to perform a method of: receiving an electronic request to access a computerized resource, wherein the electronic request comprises a user identifier identifying a user associated with the electronic request and a first access token; in response to receiving the electronic request, retrieving a time-token seed associated with the generation of access tokens during a time period, wherein the time-varying token seed is different if retrieved after the expiration of the time period; generating a second access token based on the time-varying token seed and the user identifier identifying the user: comparing the first and second access tokens to determine a similarity between the respective access tokens; and based on the similarity between the respective access tokens, determining whether to allow the user access to the computerized resource.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
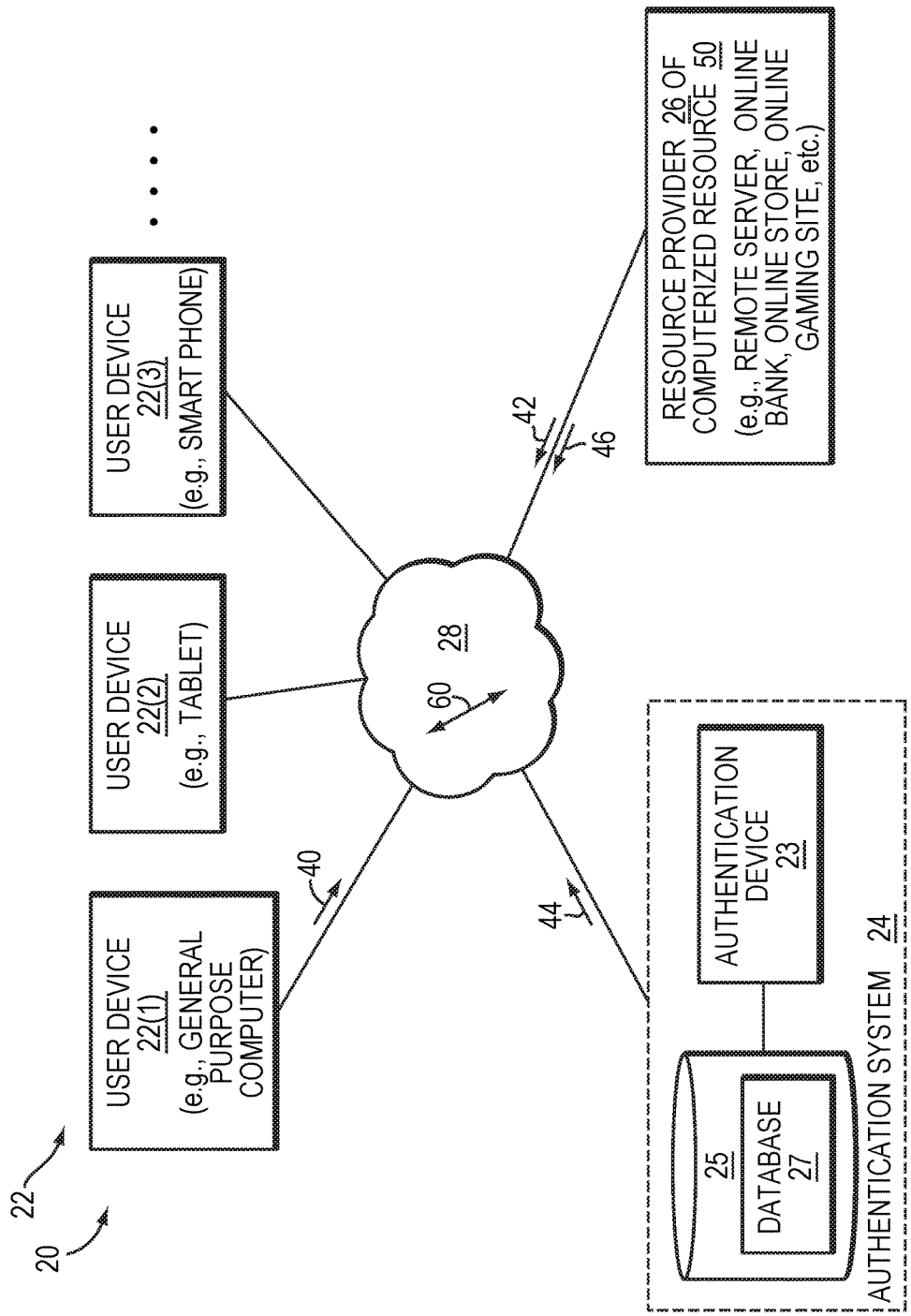
FIG. 1 is a block diagram showing particular components of an electronic environment.

FIG. 1 shows an electronic environment 20. The electronic environment 20 includes user devices 22(1), 22(2), 22(3), ... (collectively, user device 22), an authentication system 24, a resource provider 26, and communications medium 28.

Each user device 22 is constructed and arranged to perform useful work on behalf of a user. For example, the user device 22(1) may be a general purpose computer, the user device 22(2) may be a tablet, the user device 22(3) may be a smart phone, and so on.

The authentication system 24 is constructed and arranged to perform authentication operations on behalf of the resource provider 26. Authentication system 24 includes an authentication device 23 and a storage device 25 storing a database 27.

The resource provider 26 provides each user device 22 with access to one or more computerized resources 50 following successful user authentication. An example of a suitable resource provider 26 is a data storage array which provides secure access to files, directories, volumes, LUNs, etc. Another example of a suitable resource provider 26 is a web server which provides secure access to various web pages. Yet another example of a suitable resource provider 26 is a server which provides secure user account and/or transactional access such as that for an online banking site, an online store, an online gaming site, and so on. Other types of resource providers are suitable for use as well.

The communications medium 28 connects the various components of the electronic environment 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, etc.

During operation, the user device 22 initially attempts to login with the resource provider 26 to access the computerized resource 50. The user device 22 provides a login request 40 that includes identification information comprising a user identifier. The resource provider 26 responds to the request 40 by sending a request transmission 42 through the communications medium 28 to the authentication system 24 directing the authentication system 24 to perform an authentication operation. Upon receiving the request transmission 42, the authentication system 24 determines that the user associated with the request 40/42 has not authenticated previously and provides 44 a first access token to the resource provider 26 based on the user identifier and a tune-varying token seed retrieved from the database 27 by the authentication device 23 of the authentication system 24. The resource provider 26 in turn provides 46 the first access token to the user device 22 for facilitating user access to the computerized resource 50.

Here, the database 27 is a fixed sized database comprising a plurality of time-varying token seeds for use in the generation of access tokens during discrete time periods. For example, the database 27 may comprise five entries, each entry having an index and an associated time-varying token seed with each respective token seed used during different time periods to generate access tokens. In this arrangement, the authentication device 23 moves sequentially in a round robin manner between the entries in the database 27 upon the expiration of a time period such that only one time-varying token seed is used at any one time to generate access tokens during a time period. Accordingly, the time-varying token seed in one entry in the database 27 is used for a time period before the authentication device 23 moves to the next entry in the database 27 upon the expiration of the time period, and so on. It should be noted that the authentication device 23 also replaces the time-varying token seed, upon the expiration of the time period associated therewith, with a new time-varying token seed such that the next time the authentication device 23 arrives at that entry in the database 27 the time-varying token seed at that entry will be different to the last time. The index will, however, remain the same.

Thus, in response to receiving the initial request 40/42, the authentication device 23 identifies and retrieves a time-varying token seed in the database 27 used to generate access tokens during the time period when the request 40/42 is received. The authentication device 23 in turn utilizes the retrieved token seed to generate the first access token by hashing the retrieved token seed and the user identifier. As will be appreciated from the foregoing, the token seed retrieved will be the same for all users that authenticate during the time period in which the token seed is used to generate access tokens. However, the first access token is formed by hashing the token seed and the user identifier such that the first access token is unique to the user. The authentication device 23 then provides 44/46 the first access token to the user along with the index corresponding to the token seed in the database 27.

Next, and sometime later, the user device 22 sends another request 40 to access the computerized resource 50. The request 40 comprises the user identifier, the first access token and the index as provided above to the user. The resource provider 26 responds by sending a request transmission 42 to the authentication system 24 to perform an authentication operation. In turn, the authentication device 23 identifies the entry in the database 27 associated with the index and returns the time-varying token seed in the identified entry. It should be noted that the index will not have changed since the initial authentication (although the token seed may have changed depending on the amount of time to have lapsed since the initial authentication). The authentication device 23 generates a second access token by hashing the returned token seed and the user identifier. The authentication device 23 compares the first and second access tokens and sends a result 44 to the resource provider 26. The resource provider 26 then sends a login response 46 back to the user device 22 either allowing, or disallowing further access. If the first and second access tokens match, the user is authenticated and access, granted to the computerized resource 50. Otherwise, either the first access token is an invalid token, or the time period associated with the retrieved token seed for the first access token has elapsed, and access is denied. Further details will now be provided with reference to FIG. 2.

Figure 2:
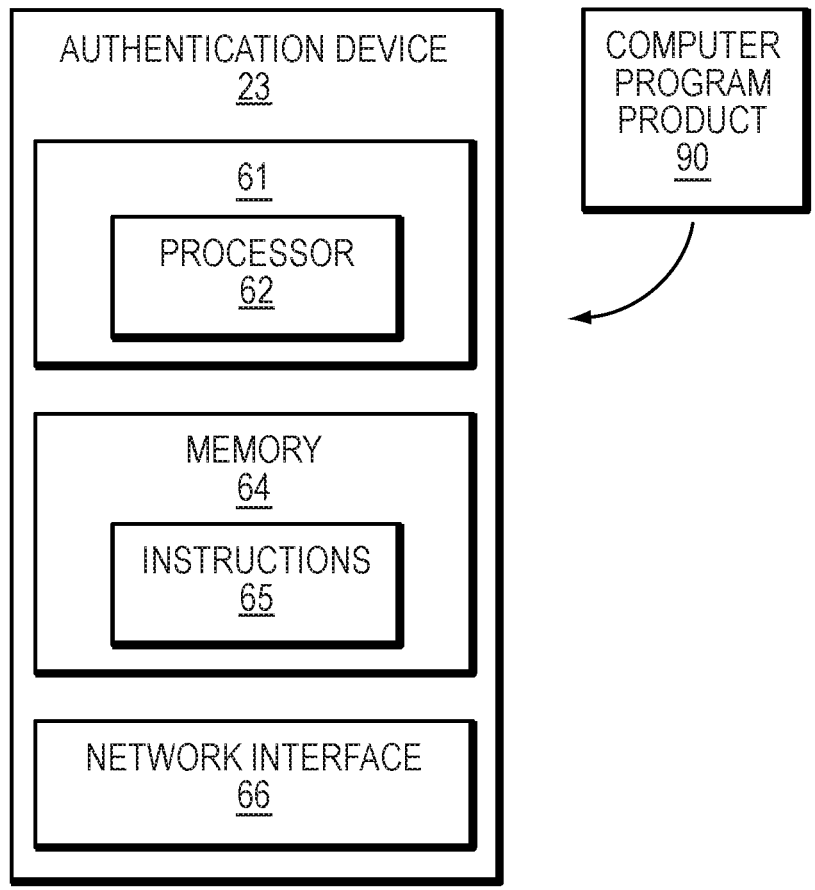
FIG. 2 is a block diagram showing components of an authentication device within the electronic environment shown in FIG. 1.

FIG. 2 illustrates components of the authentication device 23 of the authentication system 24 including a controller 61 which in turn includes a processor 62, a memory 64 and a network interface 66.

Memory 64 is configured to store code which includes instructions 65 to process an authentication request from resource provider 26. Memory 64 is further configured to store data from database 27 and request 42. Memory 64 generally takes the form of, e.g., random access memory, flash memory or a non-volatile memory.

Processor 62 can take the form of, but is not limited to, an Intel or AMD-based MPU, and can be a single or multi-core running single or multiple threads. Processor 62 is coupled to memory 64 and is configured to execute the instructions 65 stored in memory 64.

Network interface 66 is constructed and arranged to send and receive data over communications medium 28. Specifically, network interface 66 is configured to receive request 42 from and to send authentication result 44 to the resource provider 26.

In some arrangements, the authentication device 23 is implemented by a set of processors or other types of processing circuitry running software. In such arrangements, the software instructions can be delivered to authentication device 23 in the form of a computer program product 90 having a non-transitory computer readable storage medium which stores the instructions in a non-volatile manner. Alternative examples of suitable computer readable storage media include tangible articles of manufacture and apparatus such as CD-ROM, flash memory, disk memory, tape memory, and the like.

Figure 3A:
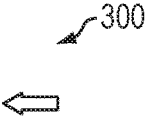
FIGS. 3A-C are block diagrams showing details of a database utilized by the authentication device of FIG. 2.
Figure 3B:
Figure 3C:

FIGS. 3A-C are block diagrams showing details of the database 27 utilized by the authentication device 23 of FIG. 2. The respective figures show tables 300, 310 and 320 comprising a first column describing an index and a second column describing a random value representing a token seed.

FIG. 3A illustrates a pointer indicating that the token seed 'Rand0' is currently used to generate access tokens during a first time period. However, upon the expiration of the first time period, the token seed used to generate access tokens will change from 'Rand1' to 'Rand1'. Additionally, the token seed 'Rand0' will be replaced with the token seed 'RandN+1'. The index remains '0'.

FIG. 3B illustrates a pointer indicating that the token seed used to generate access tokens at the expiration of the first time period is 'Rand1'. The token seed 'Rand1' will be used to generate access tokens for a second time period (similar to the first time period). Again, upon the expiration of the second time period, the token seed used to generate access tokens will change front 'Rand1' to 'Rand2'. Additionally, the token seed 'Rand1' will be replaced with the token seed 'RandN+2'. The index remains '1'.

FIG. 3C illustrates a pointer indicating that the token seed 'Rand2' will be the token seed used to generate access tokens upon expiration of the second time period. The token seed 'Rand2' will be used to generate access tokens for a third time period (similar to the first and second time periods). Again, upon the expiration of the third time period, the token seed used to generate access tokens will change from 'Rand2' to 'Rand3'. Additionally, the token seed 'Rand2' will be replaced with the token seed 'RandN+1'. The index will remain '2'. This process continues until all the N token seeds have been used to generate access tokens at which time the pointer goes back to the seed 'RandN+1' at the entry corresponding to index '0'.

As illustrated, each row in the tables 300, 310 and 320 store a per-row index and a random value representing a token seed used to generate access tokens for a specific time period. Multiple users who successfully authenticate within the same time period will be associated with the same token seed that will be used to generate the access token for enabling temporary user access to the computerized resource 50. However, to generate the access token, the user's unique identifier alongside the token seed is hashed to produce a unique hash value for each user that corresponds to the access token. This access token will be presented to the user along with the index from, the same row.

Future requests from this user will contain this access token and the index. Note that the access token on each user device 22 is unique because it is based on both the token seed and their user identifier. When the authentication system 24 receives a request from the user, it indexes into the table (300, 310, 320) using the provided index, retrieves the seed, and hashes the user's identifier alongside the seed. If this resultant access token matches that which was received in the user request, the user is considered authenticated. Otherwise, either the user provided an invalid token, or the time of their last successful authentication is greater than the configured system authentication timeout.

Figure 4:
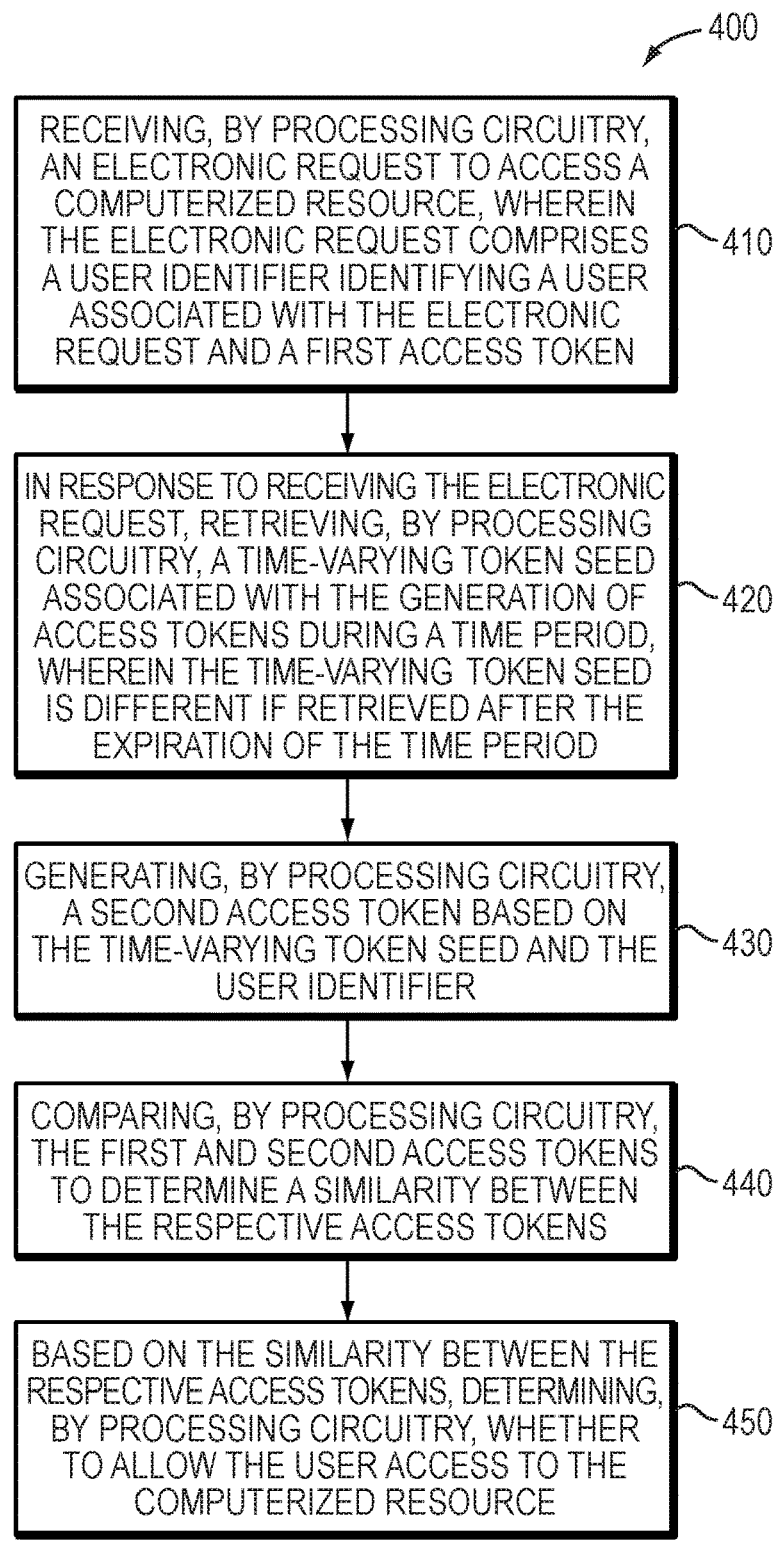
FIG. 4 is a flowchart of a procedure which is performed by the authentication device of FIG. 2.

FIG. 4 shows a flow chart which illustrates a method 400, carried out by processor 62, of processing an electronic request to access a computerized resource. At step 410, an electronic request is received to access a computerized resource. The electronic request comprises a user identifier identifying a user associated with the electronic request and a first access token. At step 420, in response to receiving the electronic request, a time varying token seed associated with the generation of access tokens during a time period is retrieved. The time-varying token seed is different if retrieved after the expiration of the time period. At step 430, a second access token is generated based on the time-varying, token seed and the user identifier identifying the user. At step 440, the first and second access tokens are compared to determine a similarity between the respective access tokens. At step 450, it is determined whether to allow the user access to the computerized resource based on the similarity between the respective access tokens.

Figure 5:
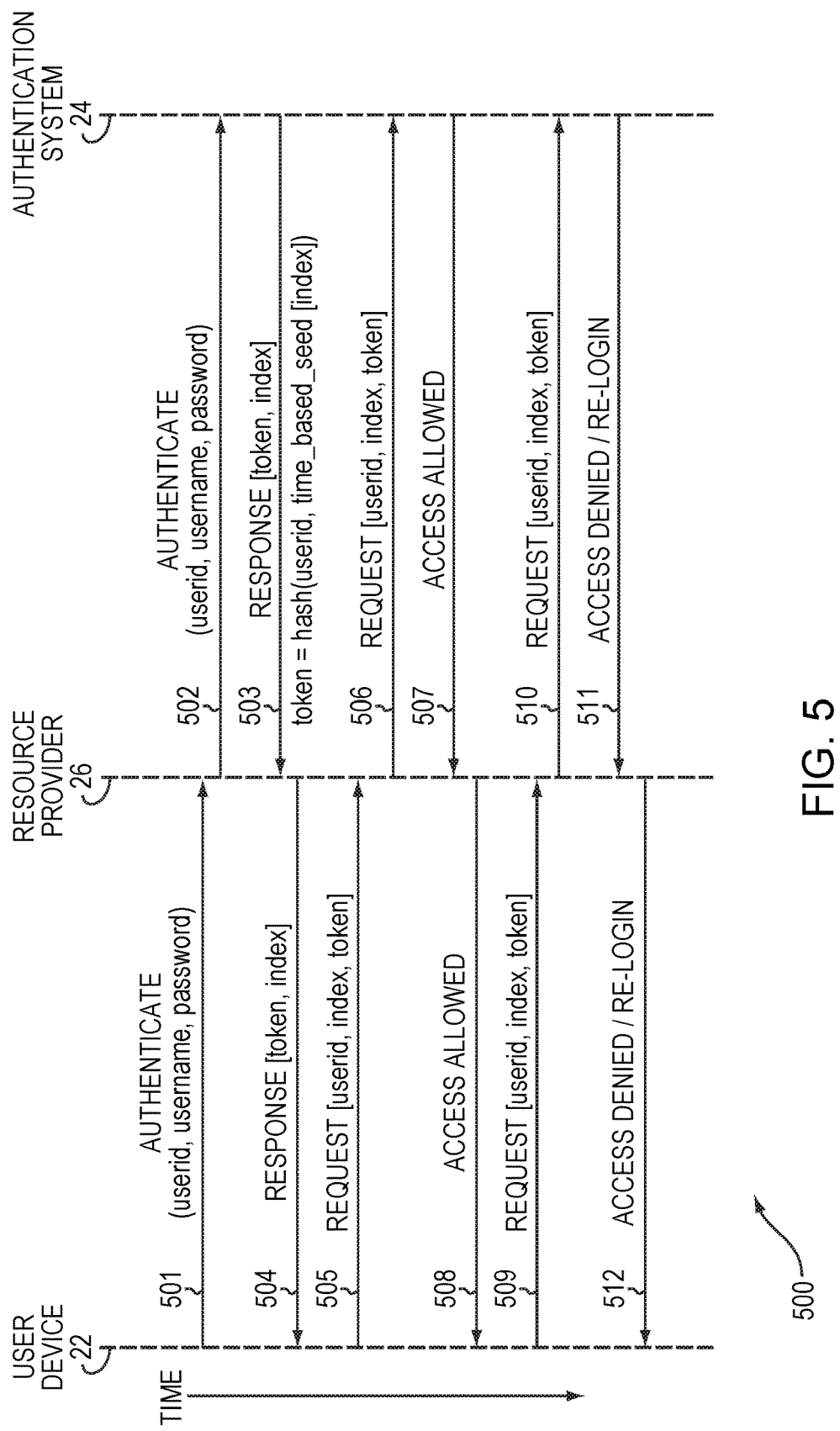
FIG. 5 is a sequence diagram illustrating, various communications between components of the electronic environment of FIG. 1.

FIG. 5 is a sequence diagram 500 illustrating various communications between components of the electronic environment 20 of FIG. 1. The diagram showing a user device 22, a resource provider 26 and an authentication system 24 communicating in the manner as described above with respect to FIG. 1.

As illustrated, the user device 22 initially sends an authentication request 501 to the resource provider 26 by providing a user identifier and a username and password. The resource provider 26 sends this request 502 to the authentication system 24 to perform an authentication operation on its behalf. The username and password are verified in the usual manner and upon successful verification the authentication system 24 responds 503 to the resource provider 26 with a first access token and index. The resource provider 26 in turn sends 504 the first access token and index to the user device 22. It should be appreciated that the first access token is formed by hashing the user identifier and the time-varying token seed used to generate access tokens at the time of the authentication.

Subsequently, the user device 22 communicates 505 with the resource provider 26 seeking access to the computerized resource 50. The communication comprising the user identifier, the index and the first access token. The resource provider 26 sends 506 the communication to the authentication system 24 to perform an authentication operation on its behalf. The authentication system 24 grants access by confirming the first access token as provided in communication 503 as valid. This involves using the index to retrieve a time varying token seed from the database 27 and generating a second access token to compare against the first access token provided in the communication 505. The authentication server 24 responds 507 to the resource provider 26 with a notification that access to the computerized resource 50 is allowed. In turn, the resource provider 26 communicates 508 with the user device 22 allowing user access to the computerized resource 50.

Next, the user device 22 again communicates 509 with the resource, provider 26 seeking access to the computerized resource 50. The communication 509 comprises the user identifier, the index and the first access token. The resource provider 26 sends 510 the communication to the authentication system 24 to perform an authentication operation on its behalf. However, the authentication system 24 denies access and requests re-login. This is because the first access token in the communication 509 is not valid. The authentication system 24 notifies 511 the resource provider 26 that access is denied and re-login is required in order to access the computerized resource 50. The resource provider 26 in turn notifies 512 the user device 22.

It should be noted that when the user device 22 logs on after the elapse of a time period associated with the token seed used to generated the first access token, the user device 22 provides the first access token in the request without knowing that it's expired. The authentication system 24 attempts to authenticate the user with that access token as described above but will not succeed. It will, therefore, direct the user to authenticate using the traditional authentication method (e.g., username/password, etc.). The authentication system 24 verifies, for example, the username/password, in the traditional manner. Upon successful verification, the authentication system 24 or the resource provider 26 responds to the user with another access token and index as described above.

While various embodiments of the present disclosure have been particularly shown and described, it will be understood by those skilled in the art that various changes in form and details may be made therein without departing from the spirit and scope of the present disclosure as defined by the appended claims.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method, comprising:
   receiving, by processing circuitry, an electronic request to access a computerized resource, wherein the electronic request comprises a user identifier identifying a user associated with the electronic request, a first access token, and an index value;
   in response to receiving the electronic request, retrieving, by processing circuitry, a token seed associated with the index value from a data source;
   generating, by processing circuitry, a second access token based on the retrieved token seed and the user identifier identifying the user;
   comparing, by processing circuitry, the first and second access tokens to determine a similarity between the respective access tokens;
   based on the similarity between the respective access tokens, determining, by processing circuitry, whether to allow the user access to the computerized resource;
   wherein the data source comprises a plurality of entries, each entry including an index value and a token seed for use in access token generation during discrete time periods, each entry being updated upon the expiration of the discrete time period related thereto such that the token seed is replaced with a different token seed but the index value remains the same;
   further wherein retrieving a token seed associated with the index value from the data source, comprises:
      identifying the entry associated with the index value; and
      returning the token seed in the identified entry for use in the generation of the second access token.

2. The method as claimed in claim 1, wherein the first access token as received represents an access token previously generated for the user for enabling temporary access of the computerized resource.

3. The method as claimed in claim 1, wherein the first access token corresponds to a hash value resulting from the hashing of the user identifier and a token seed used for access token generation during a time period and that is different after the expiration of the time period.

4. The method as claimed in claim 3, wherein the token seed used to generate the first access token is the same as the token seed used to generate the second access token when the time period associated with the token seed used to generate the first access token has not expired at the time of retrieval of the token seed.

5. The method as claimed in claim 3, wherein the token seed used to generate the first access token is different to the token seed used to generate the second access token when the time period associated with the token seed used to generate the first access token has expired at the time of retrieval of the token seed.

6. The method as claimed in claim 1, wherein generating the second access token comprises hashing the user identifier and the retrieved token seed.

7. An apparatus, comprising:
   memory; and
   processing circuitry coupled to the memory, the memory storing instructions which, when executed by the processing circuitry, cause the processing circuitry to:
      receive an electronic request to access a computerized resource, wherein the electronic request comprises a user identifier identifying a user associated with the electronic request, a first access token, and an index value;
      in response to receiving the electronic request, retrieve a token seed associated with the index value from a data source;
      generate a second access token based on the retrieved token seed and the user identifier identifying the user;
      compare the first and second access tokens to determine a similarity between the respective access tokens;
      based on the similarity between the respective access tokens, determine whether to allow the user access to the computerized resource;
      wherein the data source comprises a plurality of entries, each entry including an index value and a token seed for use in access token generation during discrete time periods, each entry being updated upon the expiration of the discrete time period related thereto such that the token seed is replaced with a different token seed but the index value remains the same;

further wherein retrieving a token seed associated with the index value from the data source, comprises:

identifying the entry associated with the index value; and returning the token seed in the identified entry for use in the generation of the second access token.

8. The apparatus as claimed in claim 7, wherein the first access token as received represents an access token previously generated for the user for enabling temporary access of the computerized resource.

9. The apparatus as claimed in claim 7, wherein the first access token corresponds to a hash value resulting from the hashing of the user identifier and a token seed used for access tokens generation during a time period and that is different after the expiration of the time period.

10. The apparatus as claimed in claim 9, wherein the token seed used to generate the first access token is the same as the token seed used to generate the second access token when the time period associated with the token seed used to generate the first access token has not expired at the time of retrieval of the token seed.

11. The apparatus as claimed in claim 9, wherein the token seed used to generate the first access token is different to the token seed used to generate the second access token when the time period associated with the token seed used to generate the first access token has expired at the time of retrieval of the token seed.

12. The apparatus as claimed in claim 7, wherein generating the second access token comprises hashing the user identifier and the retrieved token seed.

13. A computer program product having a non-transitory computer readable medium which stores a set of instructions, the set of instructions, when carried out by processing circuitry, causing the processing circuitry to perform a method of:

receiving an electronic request to access a computerized resource, wherein the electronic request comprises a user identifier identifying a user associated with the electronic request, a first access token, and an index value;

in response to receiving the electronic request, retrieving a token seed associated with the index value from a data source;

generating a second access token based on the retrieved token seed and the user identifier identifying the user;

comparing the first and second access tokens to determine a similarity between the respective access tokens;

based on the similarity between the respective access tokens, determining whether to allow the user access to the computerized resource;

wherein the data source comprises a plurality of entries, each entry including an index value and a token seed for use in access token generation during discrete time periods, each entry being updated upon the expiration of the discrete time period related thereto such that the token seed is replaced with a different token seed but the index value remains the same;

further wherein retrieving a token seed associated with the index value from the data source, comprises:

identifying the entry associated with the index value; and returning the token seed in the identified entry for use in the generation of the second access token.

14. The computer program product as claimed in claim 13, wherein the first access token as received represents an access token previously generated for the user for enabling temporary access of the computerized resource.

15. The computer program product as claimed in claim 13, wherein the first access token corresponds to a hash value resulting from the hashing of the user identifier and a token seed used for access tokens generation during a time period and that is different after the expiration of the time period.

16. The computer program product as claimed in claim 15, wherein the token seed used to generate the first access token is the same as the token seed used to generate the second access token when the time period associated with the token seed used to generate the first access token has not expired at the time of retrieval of the token seed.

* * * * *